(12) United States Patent
Morris (10) Patent No.: US 7,523,455 B2
(45) Date of Patent: Apr. 21, 2009

(54) METHOD AND SYSTEM FOR APPLICATION MANAGED CONTEXT SWITCHING

(75) Inventor: Dale Morris, Steamboat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 561 days.

(21) Appl. No.: 10/139,074

(22) Filed: May 3, 2002

(65) Prior Publication Data

US 2004/0015967 A1 Jan. 22, 2004

(51) Int. Cl.
*G06F 9/46* (2006.01)
(52) U.S. Cl. ...................................... 718/108; 712/228
(58) Field of Classification Search ......... 718/100–108; 712/228, 224, 225; 711/201, 202
See application file for complete search history.

(56) References Cited

U.S. PATENT DOCUMENTS

| | | | |
|---|---|---|---|
| 4,524,415 A | | 6/1985 | Mills, Jr. et al. |
| 4,811,209 A * | | 3/1989 | Rubinstein ................. 711/144 |
| 5,127,098 A * | | 6/1992 | Rosenthal et al. ........... 711/202 |
| 5,146,569 A | | 9/1992 | Yamaguchi et al. |
| 5,201,039 A * | | 4/1993 | Sakamura ................... 711/201 |
| 5,655,132 A * | | 8/1997 | Watson ....................... 718/104 |
| 5,799,188 A * | | 8/1998 | Manikundalam et al. .... 718/108 |
| 5,872,963 A * | | 2/1999 | Bitar et al. .................. 712/233 |
| 5,890,189 A * | | 3/1999 | Nozue et al. ................ 711/100 |
| 5,928,356 A * | | 7/1999 | Golliver et al. ............. 712/228 |
| 5,940,859 A * | | 8/1999 | Bistry et al. ................ 711/147 |
| 5,995,750 A * | 11/1999 | Samson et al. .............. 718/107 |
| 6,112,292 A * | 8/2000 | Zahir et al. ................. 712/200 |
| 6,199,143 B1 * | 3/2001 | Segal .......................... 711/120 |
| 6,199,156 B1 | 3/2001 | Yoder et al. |
| 6,223,208 B1 * | 4/2001 | Kiefer et al. ................ 718/108 |
| 6,230,259 B1 * | 5/2001 | Christie et al. ............. 712/228 |
| 6,233,599 B1 * | 5/2001 | Nation et al. ............... 718/102 |
| 6,247,109 B1 * | 6/2001 | Kleinsorge et al. ............ 712/13 |
| 6,247,113 B1 * | 6/2001 | Jaggar ........................ 712/200 |
| 6,408,325 B1 * | 6/2002 | Shaylor ...................... 718/108 |
| 6,456,891 B1 * | 9/2002 | Kranich et al. ................. 700/2 |
| 6,651,163 B1 * | 11/2003 | Kranich et al. .............. 712/244 |
| 6,697,935 B1 * | 2/2004 | Borkenhagen et al. ...... 712/228 |
| 6,766,515 B1 * | 7/2004 | Bitar et al. .................. 718/100 |
| 6,772,419 B1 * | 8/2004 | Sekiguchi et al. ........... 719/319 |
| 6,826,748 B1 * | 11/2004 | Hohensee et al. ........... 717/130 |
| 7,275,246 B1 * | 9/2007 | Yates et al. ................. 718/100 |
| 2002/0038416 A1 * | 3/2002 | Fotland et al. .............. 712/228 |
| 2002/0116436 A1 * | 8/2002 | Whitton ..................... 709/100 |

FOREIGN PATENT DOCUMENTS

EP 0424031 B1 11/1996

* cited by examiner

*Primary Examiner*—Van H Nguyen (57) ABSTRACT

A method for application managed CPU context switching. The method includes determining whether state data of a CPU is valid for a process. The determining is performed by the process itself. If the state data of the CPU is not valid for the process, the process accesses functional hardware of the CPU to load new state data into the CPU. The process then continues to execute on the CPU using the new state data. If a context switch occurs, the existing state data of the CPU is invalidated. The state data of the CPU can be invalidated by an operating system without storing the state data in main memory.

15 Claims, 6 Drawing Sheets

METHOD AND SYSTEM FOR APPLICATION MANAGED CONTEXT SWITCHING

TECHNICAL FIELD

The present invention pertains to the field of digital systems. More particularly, the present invention relates to the optimization of software applications executing on a computer system platform.

BACKGROUND ART

Digital computers are being used today to perform a wide variety of tasks. Many different areas of business, industry, government, education, entertainment, and most recently, the home, are tapping into the enormous and rapidly growing list of applications developed for today's increasingly powerful computer devices.

As computer systems become increasingly ubiquitous and widespread, there is increasing interest in improving the performance and software execution speed of the computer systems. One method of increasing performance is to reduce unnecessary idle time by increasing the number of software based processes which may be executing on a given processor. Modern operating systems support multitasking, wherein two or more comparatively independent software processes execute during runtime on a common computer system.

Accordingly, one of the most important tasks of an operating system kernel is to manage processes. Generally, a process is a program sequence of instructions (sometimes referred to as "threads") in execution. The execution of the program sequence creates a processor state, or CPU state, stored within the various registers and memory locations of the processor. Thus, when processes are changed, or switched, the processor state, or context, is correspondingly switched. During a context switch, the state of the old process is saved and the state of the new process is loaded. This means that context switching is generally pure overhead because the computer system does not perform any work when a switch occurs. For example, a typical context switch can take between 100 and 1000 instructions and happen as frequently as 400 times a second. Additionally, the instructions required to implement context switches typically involve accesses (both reads and writes) to main memory, which can be very time consuming. Thus, frequent context switching of large amounts of processor state data can be a major factor in overall computer system performance.

The performance penalties involved in context switching large amounts of processor state data has become an important design consideration with new generations of CPUs. For example, increasing the size and number of general purpose registers provides advantages for some performance aspects. However, increasing the size and number of general purpose registers also increases the amount of processor state data that must be saved and restored on context switches.

Similarly, there are many instances where a processor architecture can be modified with added, special purpose functional hardware (e.g., multi-port memory look up tables, large register sets, and the like) to improve the performance of certain software applications. However, such modifications are often forgone, due to the unacceptable performance penalties associated with the resulting large amount of added processor state data.

Thus, prior art context switching methods, wherein the operating system saves and restores large amounts of processor state data on every context switch, impose an excessive system performance burden, and decrease overall processor throughput. The performance burden exists even in a case where none of the processes executing actually use any new functional hardware.

Additionally, for existing processor architectures, there are a number of application compatibility problems with increasing the size of processor state data. Because of this, operating system vendors are loathe to add even small amounts of processor state data to process context. Even if an operating system is modified to support the saving and restoring of some new functional hardware (e.g., added special purpose register state), this newer version of the operating system is then required in order to use the new functionality. Requiring a new version of an operating system in order to obtain the benefit of a new feature can be a significant barrier to acceptance. Many customers prefer to upgrade their hardware and operating system software separately.

Another prior art approach is to add such processor state data, but to restrict its use to a single privileged process (e.g., the one or two applications for which the new functional hardware is added). This approach has been used before with special graphics hardware, for example, but severely limits the usefulness of the new feature. Such restrictions on use tend to go against the nature of general purpose of CPUs.

Thus the prior art is problematic in that computer systems and their applications are often constrained in situations where improvements or optimizations to processor hardware causes an increase in the amount of processor state data. Additionally, the prior art is problematic in that context switching tends to be handled in a standardized fashion regardless of any particular requirements of a given process, thus guaranteeing the imposition of performance penalties.

DISCLOSURE OF THE INVENTION

A method for application managed CPU context switching. The method includes determining whether state data of a CPU is valid for a process. The determination is performed by the process itself. If the state data of the CPU is not valid for the process, the process accesses functional hardware of the CPU to load new state data into the CPU. The process then continues to execute on the CPU using the new state data.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

In the following detailed description of the present invention, numerous specific details are set forth in order to provide a thorough understanding of the present invention. However, it should be understood by one skilled in the art that the present invention may be practiced without these specific details. In other instances well known methods, procedures, components, and circuits have not been described in detail as not to obscure aspects of the present invention unnecessarily.

The embodiments of the present invention comprise a method and system for managing CPU state data on a per process basis. The embodiments of the present invention enable improvement and optimization of processor hardware without incurring excess of performance penalties due to added processor state data. The embodiments of the present invention handle context switching on a per-process basis in accordance with the particular needs and requirements of the processes executing on a CPU.

In one embodiment, the present invention is implemented as a method for managing CPU state data on a per process basis. The method includes determining whether state data of a CPU is valid for a process. The determination is performed by the process itself. If the state data of the CPU is not valid for the process, the process accesses functional hardware of the CPU to load new state data into the CPU. The process then continues to execute on the CPU using the new state data. If a context switch occurs, the existing state data of the CPU is invalidated. The state data of the CPU can be invalidated by an operating system without storing the state data in main memory. In this manner, the managing of context switching on a per process basis avoids those situations where added processor state data imposes performance penalties on all processes. Context switching is handled in accordance with the particular requirements of a given process, thereby eliminating the across-the-board imposition of performance penalties.

Figure 1:
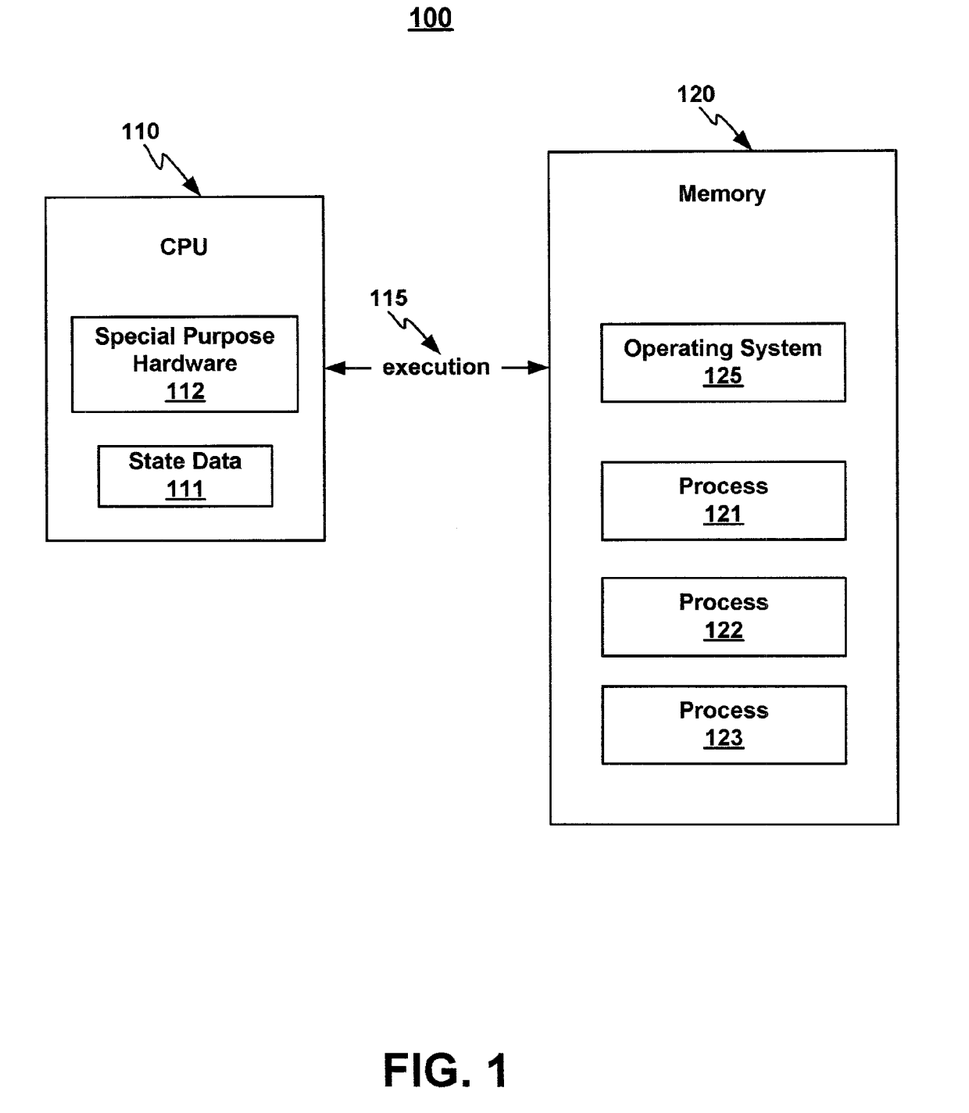
FIG. 1 shows a diagram of a system in accordance with one embodiment of the present invention.

FIG. 1 shows a system 100 in accordance with one embodiment of the present invention. As depicted in FIG. 1, system 100 includes a CPU 110 and a memory 120. As known by those skilled in the art, system 100 shows the basic components of a computer system platform as used to implement software based application functionality. Application functionality is implemented by the CPU 110 executing instructions and accessing data within the memory 120.

In the system 100 embodiment, a plurality of processes 121-123 are instantiated within the memory 120 and execute on the CPU 110 in a runtime environment (e.g., multitasking). In addition to the processes 121-123, an operating system 125 is also instantiated within the memory 120. The run-time environment of CPU 110 implements a context switching method for scheduling execution time amongst the processes 121-123, the operating system 125, and the like. Execution of components instantiated within memory 120 are shown as the arrow 115.

In this embodiment, special-purpose hardware 112 is included within the CPU 110 to optimize execution of certain aspects of one or more of the processes 121-123. Depending upon the particular requirements of a given system, the special-purpose hardware 112 can be, for example, a register table having a plurality of entries. The register table can be used to implement one or more lookup tables for a process. The entries of the lookup tables can be used, for example, to accelerate processing of data for processor intensive applications such as encryption. Similarly, the special-purpose hardware 112 can comprise an extra set of general-purpose registers configured to speed the processing of computing intensive applications (e.g., simulations, etc.). In each case, the inclusion of the special-purpose hardware 112 causes a corresponding increase in processor state data. This added state data needs to be efficiently handled during context switching. The state data associated with the execution of a process (e.g., one of the processes 121-123) is shown as the state data 111.

Figure 2:
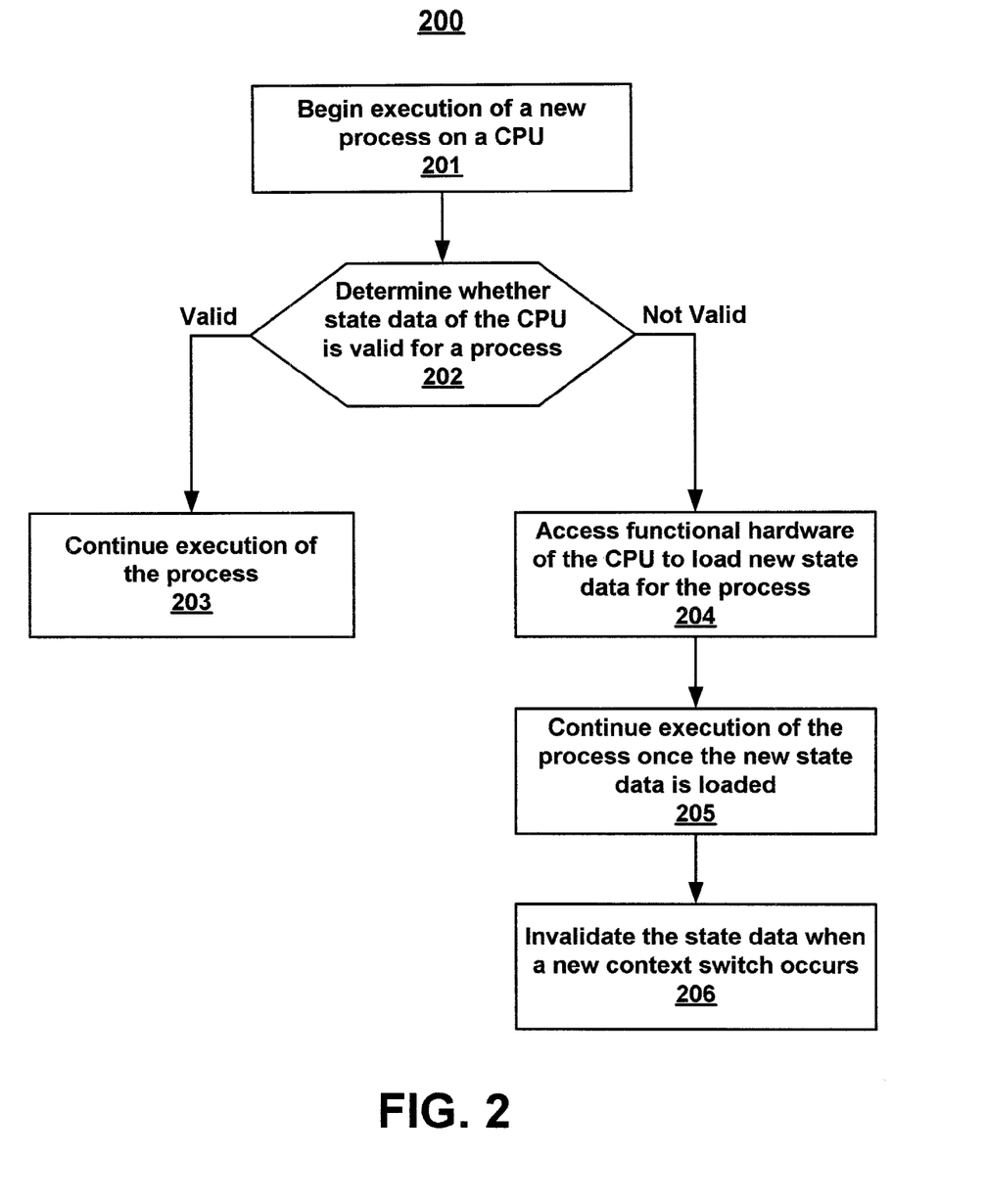
FIG. 2 shows a flowchart of the steps of a method for managing CPU state data on a per process basis during context switching in accordance with one embodiment of the present invention.

FIG. 2 shows a flowchart of the steps of a process 200 in accordance with one embodiment of the present invention. As depicted in FIG. 2, process 200 shows the steps involved in a method for managing CPU state data on a per process basis during context switching.

Process 200 begins in step 201, where execution of a new process (e.g., one of processes 121-123) is invoked. In step 202, once the new process begins execution, the new process determines whether state data (e.g., state data 111) within the CPU (e.g., CPU 110) is valid for the process. State data is valid for the process, for example, in a case where the state data 111 stored within CPU 110 has been unaltered from a prior occasion where the process was running. This can occur, for example, when a given process is interrupted by the execution of another process. During the interruption, the context 111 is switched from the first process to the second process. However, if the second process does not alter the contents of the registers of the CPU, the state data remains as it was when the first process is running. In such case, the state data 111 would be considered valid, avoiding the need to reload.

If the state data 111 is valid, process 200 proceeds to step 203 where execution of the process continues. If the state data 111 is not valid, process 200 proceeds to step 204, where the new process accesses functional hardware (e.g., special-purpose hardware 112) of the CPU 110 to reload its state data. Subsequently, in step 205, once the new state data is loaded, execution of the process continues.

Then, in step 206, process 200 determines whether a new context switch occurs. If a new context switch occurs, the state data existent in the CPU is invalidated. If a context switch occurs, since the existing state data is specific to the previous process, the existing state data of the CPU is invalidated. The state data of the CPU can be invalidated by an operating system without storing the state data in main memory. In this manner, the managing of context switching in accordance with the needs of individual processes avoids those situations where added processor state data imposes performance penalties on all processes. Context switching is handled in accordance with the particular requirements of a given process, thereby eliminating the across-the-board imposition of performance penalties.

Thus, additional state data caused by the inclusion of the special-purpose hardware 112 is managed on a per-process basis. Additionally, management of the state data is implemented without requiring any changes in the operating system to do so. Management of the state data is included within the processes (e.g., one or more of processes 121-123) themselves. The embodiments of the present invention provide a mechanism whereby an application which uses the new special-purpose hardware 112 can manage the state data itself, even though it does not have visibility into when context switches occur.

In implementing this functionality, embodiments the present invention provide: a method for a given process to reload its associated state data; a method for a given process to determine whether its state data is loaded in the CPU; and a method for invalidating the state data when the state data no longer corresponds to the process executing on CPU.

Generally, state data for the added special-purpose hardware 112 is treated as process data that is managed by the process itself as opposed to traditional prior art context data that is swapped in and out by the operating system (e.g., operating system 125). The hardware 112 supports a validity indication which indicates to a given process whether its state data associated with hardware 112 is loaded or not.

Figure 3:
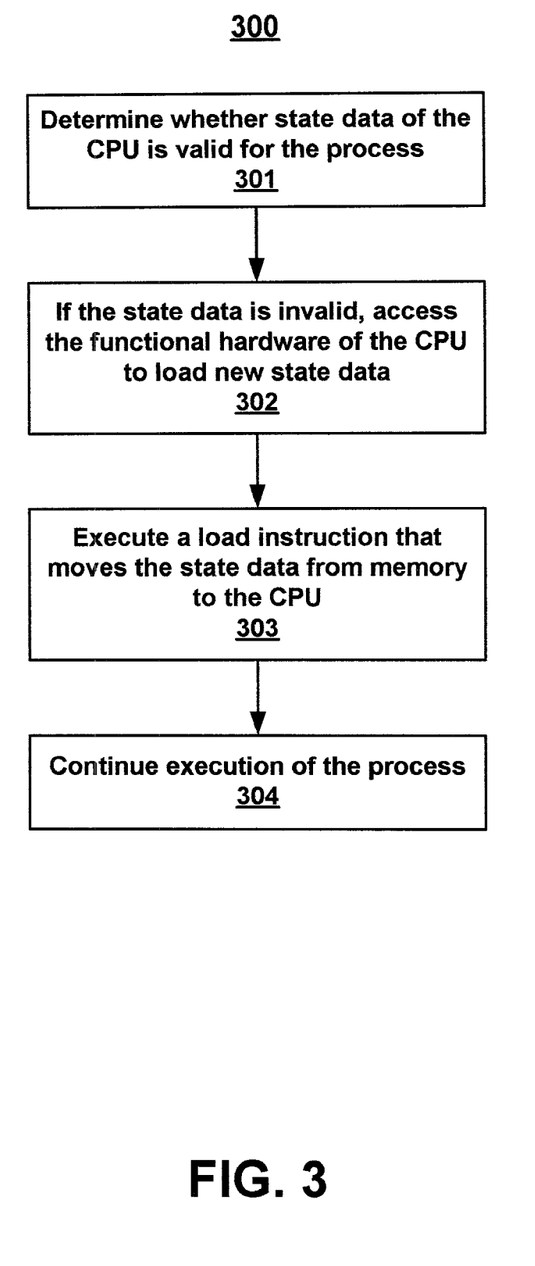
FIG. 3 shows a flowchart of the steps of a method for loading state data into the CPU in accordance with one embodiment of the present invention.

FIG. 3 shows the steps of a process 300 for loading state data into the CPU in accordance with one embodiment of the present invention. In step 301, method 300 determines whether state data of the CPU is valid for the given process, as described above. In step 302, if the state data is not valid, the process accesses functional hardware 112 to load new state data. In step 303, in this embodiment, the new state data is loaded by executing a load instruction that completely moves state data from memory 120 to the CPU 110. Although the state data is moved line by line from the memory 120 to CPU 110, only the single instruction is required. Alternatively, it should be noted that the context can be loaded by executing a sequence of load and store instructions. In step 304, execution of the process continues.

Figure 4:
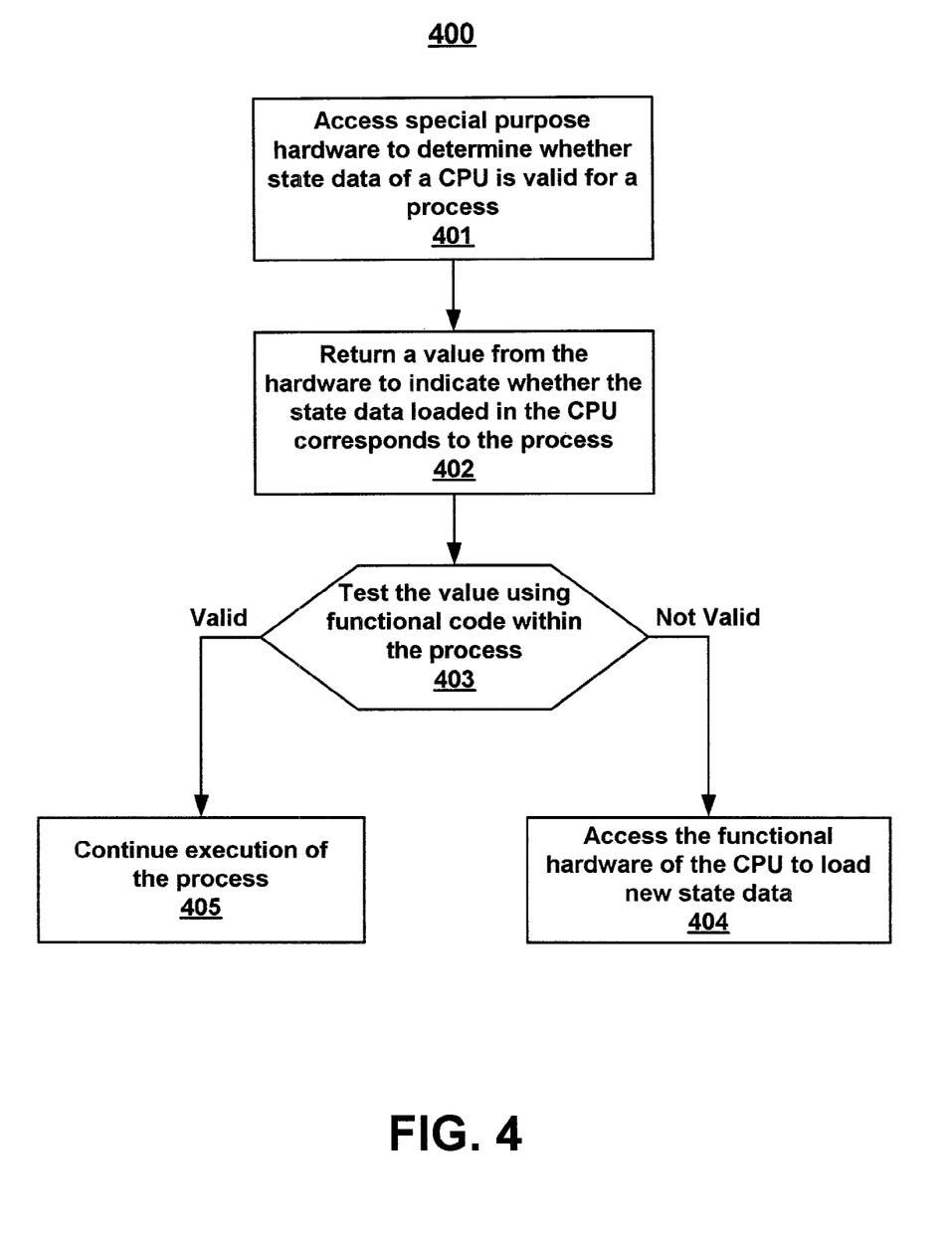
FIG. 4 shows a flow chart of the steps of a method for determining whether currently loaded state data is valid for a given process in accordance with one embodiment of the present invention.

FIG. 4 shows the steps of a method 400 for determining whether a currently loaded state data is valid for a given process in accordance with one embodiment of the present invention. For checking the validity of state data, a number of options can be implemented. In one embodiment, the hardware 112 access instruction spawns an interruption if the state data 111 corresponding to the hardware 112 is not loaded, and then simply map this interruption to a user-specified signal handler, which could then load the state. This approach would add some amount of overhead to the loading of state data 111 (which would have to occur after every time the application is context switched out and then back in again). Additionally, there would exist some degree of operating system dependency if a new type of interrupted is implemented for this event.

Thus one method is to have the hardware 112 returns some value to indicate whether or not the required state data is loaded, as shown in method 400. Method 400 begins in step 401, where the process being switched in accesses the special-purpose hardware 112 to determine whether state data of the CPU is valid for the process, as described above. In step 402, a value from the hardware 112 is returned to indicate whether the state data 111 loaded in the CPU 110 corresponds to the process. In step 403, the process tests this value. Subsequently, in step 405, if the value indicates the state data 111 is valid, execution of the process continues. In step 404, if the value indicates that the state data is not valid, new state data is loaded. Thus, an application process would test this return value on a use of the hardware 112, and call its own function to reload the state data 111 when needed (as opposed to relying upon the operating system).

It should be noted that a number alternative embodiments can be implemented for determining whether currently loaded state data is valid for given process. For example, in one embodiment, a hardware 112 access instruction can be configured to return two data values, such as a general register result, from the table lookup; and a predicate result, indicating whether or not the table is loaded. In another embodiment, an access instruction can be configured to return a single general register result, marked in some special way. In another embodiment, an access instruction can be configured to return a single general register result, and to nullify the next sequential instruction if the table is not loaded. In yet another embodiment, an access instruction can be configured to return a single general register result, and to branch to some location in the process if the table is not loaded. The process would then test this indication after every use of the access instruction. If the required state data is not loaded, then the process would call or branch off to its own function for loading up the state data, re-do the failing access instruction, and then return or branch back to the main code.

Methods for invalidating state data which no longer corresponds to a currently executing process are now described. As described above, on a context switch from one process to another, the state data 111 may need to be invalidated (so that when the old process installs state data, the new process does not compute results based on the old state data). As with determining whether a currently loaded state data is valid for given process, it should be noted that a number of different embodiments can be implemented for invalidating state data once that state data no longer corresponds to a currently executing process. These embodiments are described below.

In one embodiment, state data 111 invalidation is linked to pre-existing operating system 125 functions which are performed on context switches. This method has the advantage of not creating any operating system dependencies. In this embodiment, state data 111 would be invalidated automatically based on instructions that the operating system 125 already performs on context switch.

It should be noted that that the exact choice of what event to link the invalidate to would depend on whether the operating system 125, itself, is configured to use the special-purpose hardware 112. If the hardware 112 is not automatically used by normal compiled code and was only invoked by special library functions or by code which explicitly requests that the unit be used, then the operating system 125 would not necessarily ever need to use the hardware 112. In such a case, the invalidation would be done only when switching from one user context to another (and not, for example, when temporarily switching from the user context to the operating system context to perform some system call on behalf of the user process), thereby avoiding the need to invalidate the tables even on switches to kernel processes.

Figure 5:
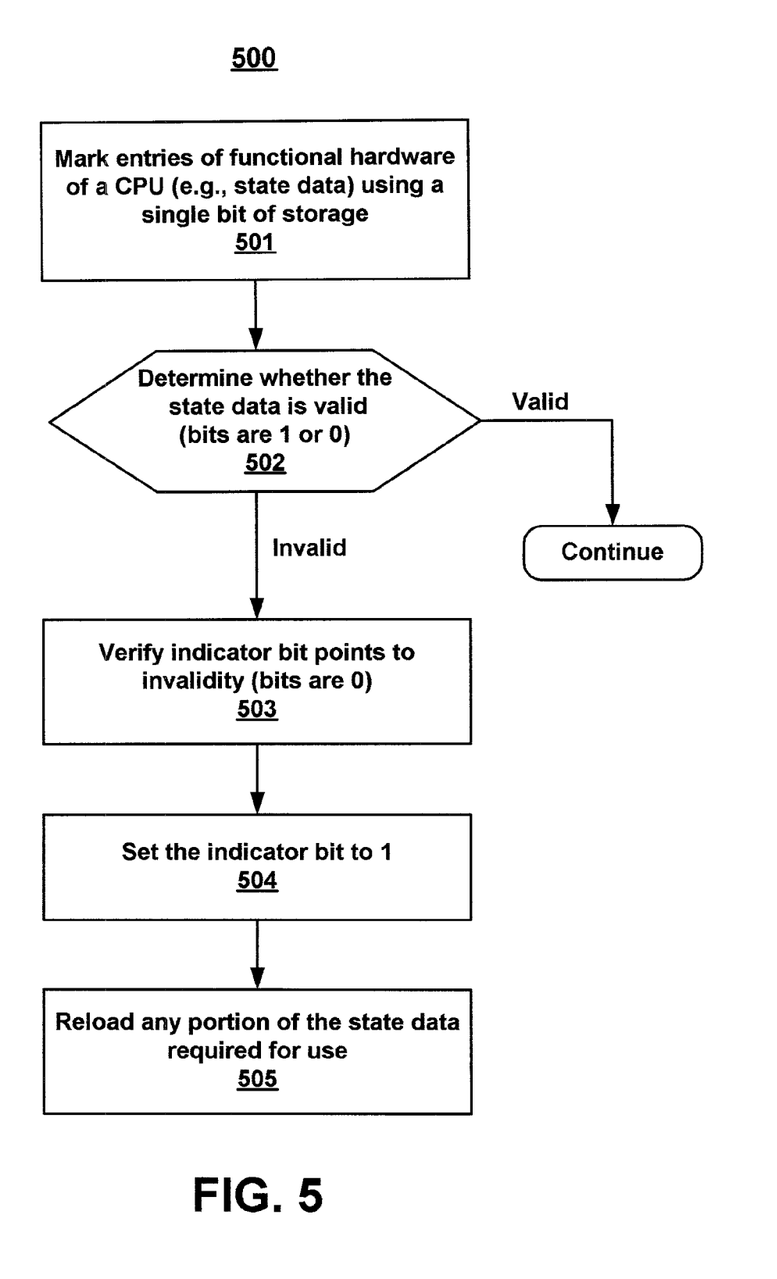
FIG. 5 shows a flowchart of steps of a state data validity indication method in accordance with one embodiment of the present invention.

Methods for the implementation of state data validity indicator are now described. As described above, when state data 111 does not correspond to the values required for the proper operation of a currently executing process, that state data 111 needs to be invalidated. In one embodiment, a validity indicator is used to manage the invalidation of the state data 111. The operation of the validity indicator needs to be reliable through a range of different scenarios which may be possible. For example, one important consideration in managing the table validity is handling the case where a process gets context switched in the middle of loading up its state data. When the process is switched back in, it must be able to determine whether it was unsuccessful in loading its state data, so that it can try again. FIG. 5 shows a flow chart of the steps of one method of accomplishing this.

FIG. 5 shows a flowchart of steps of a state data validity indication method 500 in accordance with one embodiment of the present invention. Method 500 begins in step 501, where state data entries are marked (e.g., with a single bit) as they are loaded. This validity bit is cleared by some action on the operating system 125 context switch path, and it is set by a user instruction specially for that purpose. In step 502, the process determines whether the validity bit indicates a given entry is valid. In step 503, when the process finds that the state data entries are invalid (e.g., the validity bit is 0), method 500 proceeds to step 504, where the validity bit is reset (e.g., set to 1), and in step 505, reloads any portion of the state data 111 that the process plans to use. Thus, if the process gets context switched during state data register filling, then when it is switched back to, the validity bit will be 0. The process will continue to try to fill the state, but when it thinks it is finished, it will find (for example, as soon as the process executes a hardware access instruction), that the hardware state data is invalid, and it will start over with the fill sequence.

Alternatively, the instruction used to fill the register state data could also return the same validity indicator that the hardware access instruction does, which would allow the fill code to start over immediately after the context switch.

While the method 500 embodiment has the advantage of being straight-forward and readily implementable, since the user process is in control of whether the table is valid, independent of whether it writes data into the table, the user process can read whatever the state data registers contain when the user process is switched to, simply by setting the valid bit and then using them. This could be a security issue, especially if the state data registers typically contain encryption key information, for example.

Figure 6:
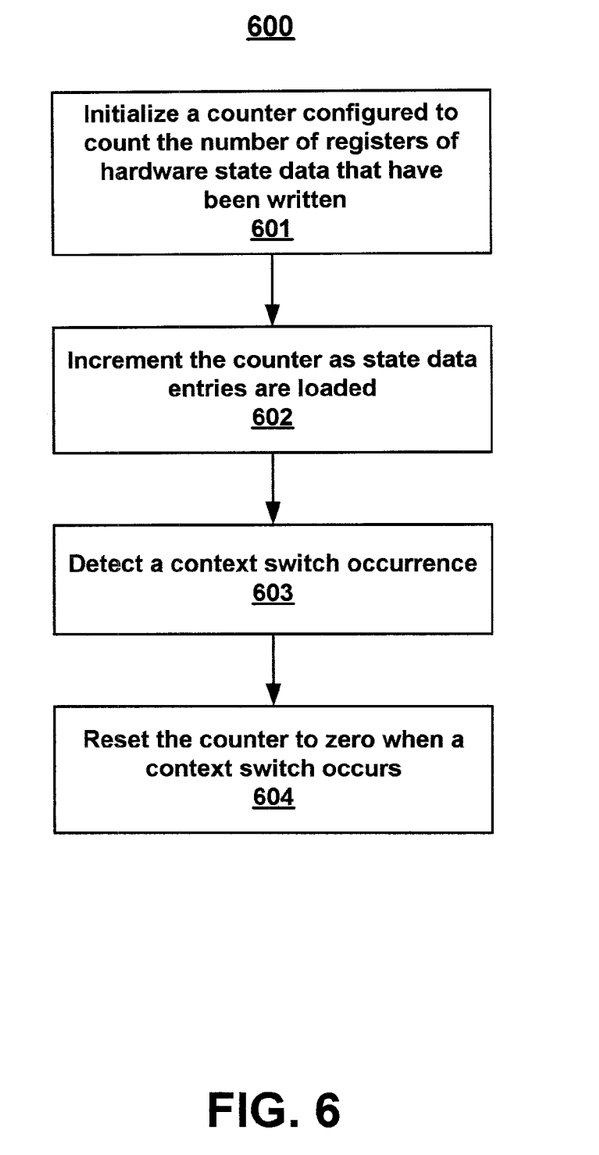
FIG. 6 shows a flowchart of the steps of a state data validity indication method in accordance with another embodiment of the present invention.

FIG. 6 shows a flowchart of the steps of a state data validity indication method 600 in accordance with one embodiment of the present invention. Method 600 indicates validity by using a counter that counts how many items in the hardware 112 register state have been written.

Method 600 begins in step 601, where a counter corresponding to the number of entries of state data is initialized. In step 602, the counter is incremented as the state data entries are loaded by the process. In step 603, a determination is made as to whether a context switch has occurred. In step 604, when a context switch has occurred, the counter is reset to zero. Hence, when the hardware 112 state data is invalidated, the counter is forced to zero, indicating the invalidity. When a value is written into the state data registers, it goes into a location in the state data 111 indexed by the counter value, and then the counter is incremented. Only when this counter has been incremented to the full size of the state data register are the state data 111 deemed to be "valid".

Thus, in normal circumstances, the application process would fill the register state by executing some instruction to invalidate the current state (forcing the counter to zero). Then it would do a sequence of writes, to fill the register state, until the state has been completely written. Since the counter is now at the maximum value, the tables are deemed "valid", and executing access instructions succeed (e.g., the access instructions do not indicate that the state data entries are invalid).

If, however, the process begins this sequence, and only gets part-way through the filling of the state when a context switch occurs, then when the operating system switches back to this process, it will resume filling the state where it left off. The counter will have been zeroed by the context switch, and so when the process thinks it has completed the fill, the counter will not be at maximum value, and so executing the hardware access instruction will indicate that the hardware state data is not valid. This will trigger the application to try again to fill the registers of the special purpose hardware 112.

Thus, in accordance with embodiments of the present invention, new functional hardware (e.g., special-purpose hardware 112) that contain their own state can be added to an existing architecture with no impact on the operating system 125. This means that such new capability could be introduced with a new processor without requiring any operating system 125 upgrade to support it.

One example would be a case where the special-purpose hardware 112 is used to implement a 32- or 64-bit datum register structure organized as tables with 256 entries each. Multiple read ports into the register structure are implemented. The tables are configured to provide a high degree of parallelism for algorithms such as bulk encryption. The efficient context switch methods of the present invention allow the tables to be shared between multiple processes 121-125 running on the system, even though the resulting state data is quite substantial in size. For example, using a "Rijndael" encryption algorithm, a 256 byte table is typically needed (32 64-bit words). A 256 entry table with 8-byte entries (256 64-bit words) can be used, which also provides the ability to do "S-box lookup" and byte permutation at the same time (giving even greater speedup). For triple-DES (data encryption system), three keys are used simultaneously, so three S-boxes are needed. Other algorithms could use eight 256-entry tables with 8-byte entries (one for each byte in the source register). This can be as much as 16 Kbytes of data. With each of these cases, the resulting large amount of state data can be much more efficiently handled using embodiments of the present invention in comparison to prior art.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order best to explain the principles of the invention and its practical application, thereby to enable others skilled in the art best to use the invention and various embodiments with various modifications as are suited to the particular use contemplated. It is intended that the scope of the invention be defined by the Claims appended hereto and their equivalents.

What is claimed is:

1. A computer-implemented method for application managed CPU context switching, comprising:
   determining whether state data of a CPU is valid for a process, the determining performed by the process;
   if the state data of the CPU is not valid for the process, accessing functional hardware of the CPU to load new state data into the CPU, the accessing performed by the process;
   executing the process on the CPU using the new state data;
   determining whether a context switch occurs; and
   if the context switch occurs, invalidating the state data of the CPU;
   wherein the invalidating the state data of the CPU, if the context switch occurs, without storing the data of the CPU.

2. The method of claim 1 further comprising:
   the invalidating the state data of the CPU performed by an operating system.

3. The method of claim 1 further comprising:
   determining whether the state data of the CPU is valid for the process by examining a value returned to the process from the functional hardware of the CPU, wherein the value indicates whether the state data of the CPU is valid for the process.

4. The method of claim 1 wherein the functional hardware of the CPU comprises a register table having a plurality of entries and the state data comprises the data of the plurality of entries.

5. In a process executing on a CPU of a computer system, a method for managing CPU state data after context switching, comprising:
   checking whether the state data of the CPU is valid for a process, the checking performed by the process;
   if the state data of the CPU is not valid for the process, accessing functional hardware of the CPU to load new state data into the CPU, the accessing performed by the process;

executing the process on the CPU using the new state data;
determining whether a second context switch occurs; and
if the second context switch occurs, invalidating the state data of the CPU;
wherein the invalidating the state data of the CPU, if the second context switch occurs, without storing the state data of the CPU.

6. The method of claim 5 further comprising:
the invalidating the state data of the CPU performed by an operating system.

7. The method of claim 5 further comprising:
after a context switch, determining whether the state data of the CPU is valid for the process by examining a value returned to the process from the functional hardware of the CPU, wherein the value indicates whether the state data of the CPU is valid for the process.

8. The method of claim 7 further comprising:
if the state data of the CPU is valid for the process, executing the process on the CPU using the state data.

9. The method of claim 5 wherein the functional hardware of the CPU comprises a register table having a plurality of entries and the state data comprises the data of the plurality of entries.

10. A computer-readable media having computer readable code which when executing by a computer system cause the computer system to implement a method for managing CPU state data on a per process basis, comprising:
checking whether state data of a CPU is valid for a process, the checking performed by the process;
if the state data of the CPU is not valid for the process, accessing functional hardware of the CPU to load new state data into the CPU, the accessing performed by the process;
executing the process on the CPU using the new state data;
checking whether a context switch occurs; and
if the context switch occurs, invalidating the state data of the CPU;
wherein the invalidating the state data of the CPU, if the context switch occurs, without storing the data of the CPU.

11. The media of claim 10 further comprising:
discarding the state data of the CPU, the discarding performed by an operating system.

12. The media of claim 10 further comprising:
determining whether the state data of the CPU is valid for the process by examining a value returned to the process from the functional hardware of the CPU, wherein the value indicates whether the state data of the CPU is valid for the process.

13. A system for managing CPU state data on a per process basis, comprising:
a CPU;
within a process executing on the CPU, means for determining whether state data of the CPU is valid for the process;
means for accessing functional hardware of the CPU to load new state data into the CPU, if the state data for the process of the CPU is not valid for the process;
means for executing the process on the CPU using the new state data;
means for determining whether a context switch occurs; and
if the context switch occurs, means for invalidating the state data of the CPU;
wherein the means for invalidating the state data of the CPU, if the context switch occurs, without storing the data of the CPU.

14. The system of claim 13 further comprising:
means for invalidating the state data of the CPU using an operating system.

15. The system of claim 13 further comprising:
means for determining whether the state data of the CPU is valid for the process by examining a value returned to the process from the functional hardware of the CPU, wherein the value indicates whether the state data of the CPU is valid for the process.

* * * * *